Nov. 28, 1950     D. SEBOUH     2,532,038
METHOD AND APPARATUS FOR PRODUCING ELECTRICAL
WAVES OF PREDETERMINED FORMATION

Filed March 27, 1945     3 Sheets-Sheet 1

INVENTOR.
Dickran Sebouh

Nov. 28, 1950 D. SEBOUH 2,532,038
METHOD AND APPARATUS FOR PRODUCING ELECTRICAL
WAVES OF PREDETERMINED FORMATION
Filed March 27, 1945 3 Sheets-Sheet 2

INVENTOR.
Dickran Sebouh

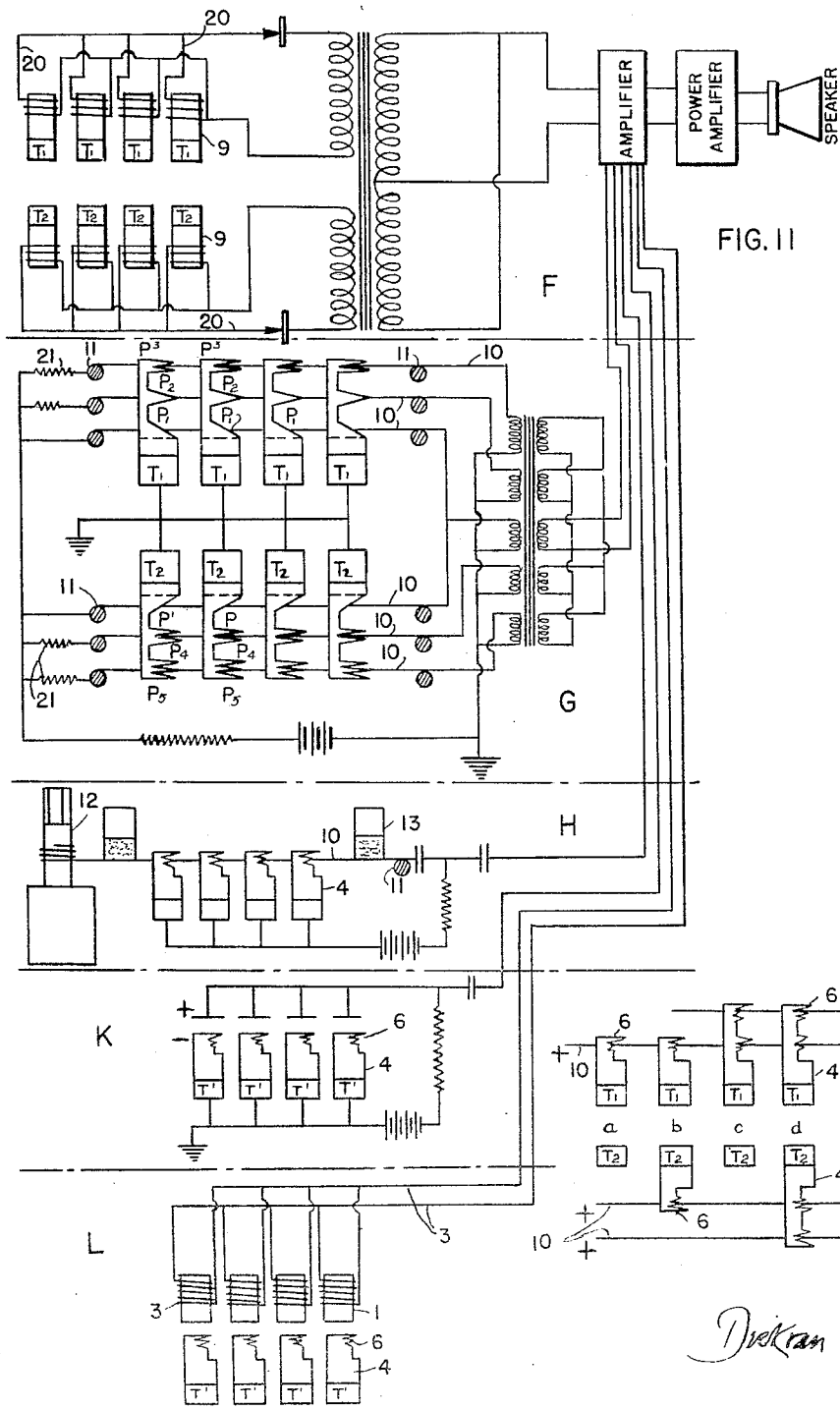

Patented Nov. 28, 1950

2,532,038

UNITED STATES PATENT OFFICE 2,532,038

METHOD AND APPARATUS FOR PRODUCING ELECTRICAL WAVES OF PREDETERMINED FORMATION

Dickran Sebouh, New York, N. Y.

Application March 27, 1945, Serial No. 585,098

9 Claims. (Cl. 84—1.28)

My invention relates to electric pick-ups used for translating sound waves originating in mechanical or electro-mechanical vibrators into corresponding electric-current impulses, and especially concerns a novel pick-up device for converting the simple harmonic motions of said vibrators into electric-current impulses having complex wave forms.

An object of my invention is to produce an electric pick-up which will translate a simple harmonic sound wave comprising but a fundamental frequency, into electric current impulses of a composite wave form containing, in addition to said fundamental frequency, a number of partial frequencies.

Another object of the invention is to provide electrical means for converting simple harmonic motions of mechanical or electro-mechanical vibrators into rich and expressive musical tones.

Still another object of the invention is to provide electrical means for producing or imitating the tone of other musical instruments with a musical instrument employing mechanical or electro-mechanical vibrators as tone generators, as for example the production or the imitation of the tone of a string piano with a tuning fork piano.

Further objects, features and advantages will more clearly appear from a consideration of the specification hereinafter especially when taken in connection with the accompanying drawings which form part of the specification and which illustrate several present preferred forms which the invention may assume.

The present preferred forms which the invention may assume are illustrated in the drawings forming part of this specification and in which, Fig. 1 is a schematic simple arrangement of the invention;

Figure 1:
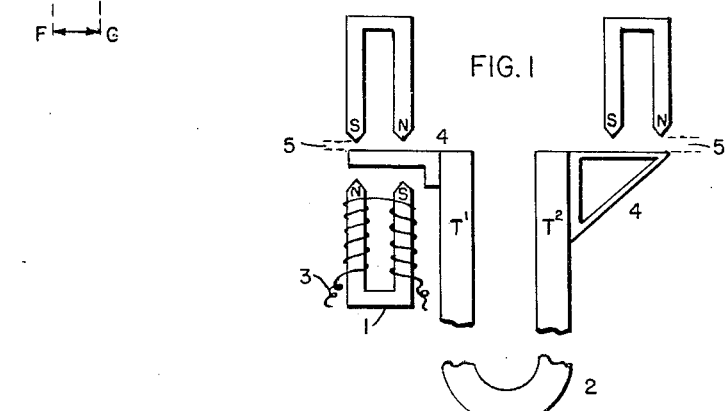
Figure 13:
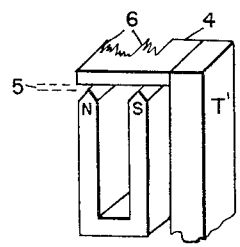
Figure 12:
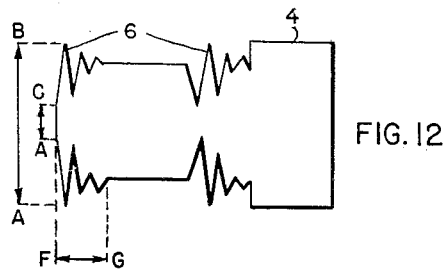
Figure 9:
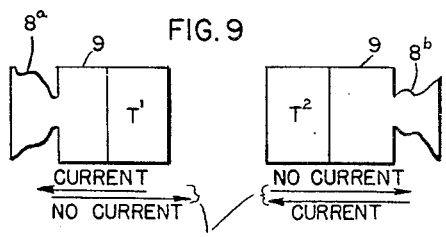
Figure 5:
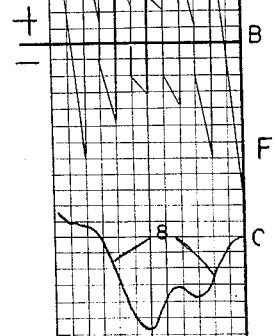
Figure 15:
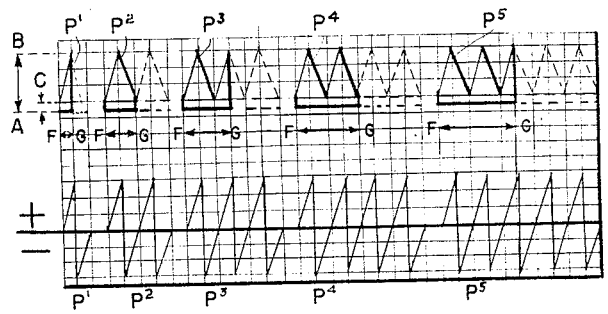
Figure 8:
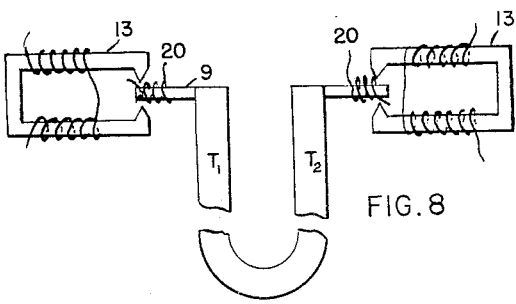
Figure 10:
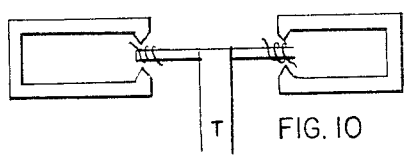
Figure 7:
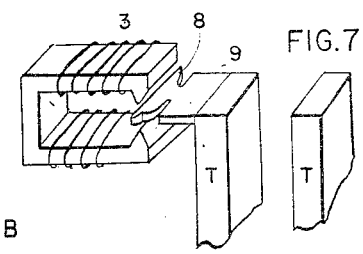
Figure 6:
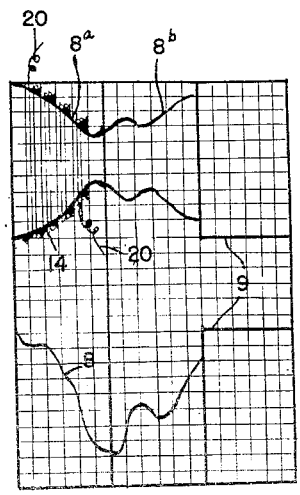

Fig. 5, divided into five parts, is a diagram of the plate formation and the waves produced thereby roughly to scale;

Fig. 6, divided into two parts, shows a diagram of a type of plate around which wire is adapted to be wound;

Fig. 7 is a partial perspective view of the type of plate shown in Fig. 6 and associated with an electro-magnet;

Fig. 8 is a schematic view of a tuning fork with plates of the type shown in Fig. 6 on both tines and associated with electro-magnets;

Fig. 9 is a plan view of the type of the plate shown in Fig. 6 with one half of the wave form assigned to each tine of the fork;

Fig. 10 shows a single tine operating two wave plates;

Fig. 11 is a diagram divided by dot-and-dash lines into zones showing various forms of the invention operatively associated with amplifying means and a loud speaker;

Fig. 12 shows a wave plate with wave formations on both edges;

Fig. 13 is a partial perspective view of a part of Fig. 1;

Fig. 14 shows various means by which the output of a vibrating fork may be enhanced;

Fig. 15 is a diagram of sine wave currents of various frequencies and of wave plates designed to produce said currents.

Ordinarily in electronic musical instruments the pick-up is fixed in proximity to a vibrating body, a tine of a tuning fork, for instance, in such a relative position that the distance or the air-gap between the pick-up and the tine will vary from a minimum value to a maximum value during each vibration of the tine. Considering the fork to be made of magnetic substance, the variations in the size of said air-gap will cause corresponding variations in the reluctance of the magnetic flux surrounding the pick-up, which will in turn induce a correspondingly varying current in the pick-up coil. As a vibration of the tine represents a simple harmonic motion so does the pattern of the induced current which when amplified and reconverted into sound waves will reproduce the simple harmonic tone of the tuning fork.

Figure 2:
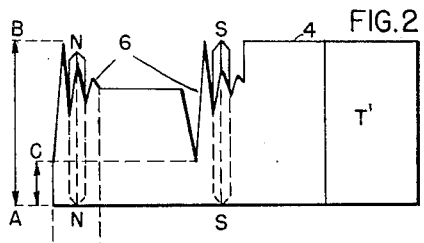
Figs. 2 and 3 are respectively very much enlarged plan views showing the forms of parts shown in Fig. 2.
Figure 3:
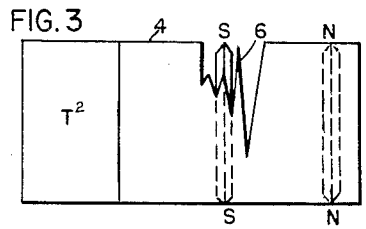

In accordance with the present invention, however, an air-gap 5 (Fig. 1) is kept constant while the desired variations in the induced current of the pickup coil 3 are produced instead by varying the dimensions of the magnetic substance occurring directly above the magnetic poles of the pick-up I at various instants during the period of one cycle of the motion of the tine. The magnetic substance just mentioned is here in the form of a thin iron or steel plate 4 (Figs. 1, 2, 3 and 13). One end of this plate is fastened to a tine TI of the fork 2 while the other free end extends outwards, on a plane at right angles to the longitudinal axis of said tine, and completely covers both poles S and N of the pick-up I. The pick-up may be fixed either slightly above or slightly below the plate so as to leave a narrow air-gap 5 between the plate and the magnetic poles as shown in Figs. 2 and 16. In the aforesaid arrangement of the pick-up, the poles, the tine and the wave plate, the air-gap 5, hence the reluctance of the magnetic flux, is constant and consequently there will be no current induced in the coil 3 during the vibration of the tine. A current of very short duration due to the possible vibration at its resonant frequency of the extended free section of the plate itself may be eliminated or reduced to an inconsequential degree by making the plate thick, as at the left of Fig. 1 and as short as possible or by making it in a form similar to the one attached to the tine T2 of the fork in Fig. 2.

In the discussion that follows, it is assumed that the fork vibrates with maximum and with uniform intensity and therefore the distance traversed by a tine from one end to the opposite end, during one cycle of the motion of the tine, is considered as constant.

Figure 4:
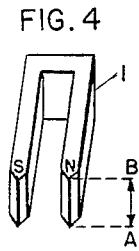
Fig. 4 is a perspective view of a preferred magnet.

While the air-gap between the magnetic poles and the plate is constant, the reluctance of the magnetic field is varied, during the period of a vibration, by varying the physical dimension of the magnetic substance (the plate 4) moving across over the poles S and N. The desired variations in said dimensions of the wave plate can be made to trace a selected wave form 6, Figs. 2 and 3, or its equivalent shown in Fig. 13. Said form may be punched out on a press machine or may be embossed on the wave plate in the same way as letters and symbols are embossed on commercial name plates. A wave plate, like the one attached to tine T2 of the fork in Fig. 4, may contain only one wave form which actuates one of the poles 5 while the other pole associates with a uniform section of said plate. However, it is preferable to have the plate contain two identical wave forms, one for each pole, acting in complete synchronization, as the plate attached to tine T1.

It is preferable to have a great number of variations in the plate dimensions successively occurring within the period of the wave in order that the curve representing the current may follow the pattern of the wave form 6 with greater fidelity. The maximum number of said variations may be effected by tapering both poles of the magnet to a thin knife edge (see Fig. 4) whereby the dimensions of the wave plate which actually faces the thin edge of each pole at any one instant during the vibration of the tine can be defined as a linear area having width which is equal to the width of the pole edge and is constant, a length that varies from the maximum A—B (Fig. 2) to the minimum A—C and a depth which is constant and is equal to the thickness of the wave plate. Thus there will be as many vibrations within the period of the wave as the number of said linear areas which can be contained in the total area of the wave form 6.

The over-all length, F—G, of the wave form 6 being equal to the length of the distance the tine traverses from one extreme point to the opposite extreme point twice during each vibration, the stationary edge of the pole N or S will successively scan the entire surface of the wave form 6 once from F to G and again in reverse from G to F during the motion of the tine in the direction from right to left and from left to right respectively within the period of a vibration and in so doing will induce in the pick-up coil a current which varies exactly in accordance with the variations in the scanned area and with a frequency corresponding to the frequency of the tine. Said current is then converted into sound waves through vacuum tube amplifier and loud speaker systems in the customary manner as for example illustrated in zone L in Fig. 11.

Inspecting the wave form 6 in A of Fig. 5, it is seen that the length of the plate area influencing the magnetic field during the vibration of the tine either increases as from M to O or decreases as from O to N. This is true for any wave form. As said areal length increases the induced current will decrease in the same direction (if positive) because more and more of the magnetic lines will pass into the increasing area of the plate and more and more of said field will collapse in a direction toward the core of the magnet. Conversely as the areal length decreases the induced current will increase in the opposite direction (negative). Accordingly if the shaded area in Fig. 5A represents the positive leg, the blank area will represent the negative length of the alternating current during the tine's motion in one direction, with this condition reversing during the tine's motion in the opposite direction. The current thus produced is shown in zone B of Fig. 5.

Electrostatic methods of translation may also be used with substantially the same means employed in electro-magnetic methods of translation above considered. In that case the wave plate 4 (Figs. 1, 2 and 3) is viewed as the negative plate and the knife-edged pole S or N as the positive plate of a condenser or vice versa. The area of the stationary and positively charged plate is constant while the area of the vibrating negative plate, exposed to the dielectric (air) at any one instant during the vibration of the tine, and therefore the capacity of said condenser, varies in accordance with the curve of the wave form 6 and thereby produces corresponding variations in the current.

Individual positively charged plates, one for each negative plate 4 and all wired in parellel, may be used as shown diagrammatically in zone K in Fig. 11. A positive plate in the form of a thin tightly stretched piano wire 10 and common to all negative wave plates 4 or sections thereof may also be used as shown in zone H of Fig. 11. One end of said wire is fastened to an insulated pin 11 while the other end is wound on a peg 12, also insulated, the purpose of which is to stretch said wire taut. The disposition of said wire, relative to each and every negative plate 4 is identical to the disposition of the knife-edge of magnetic pole S or N of Fig. 3, relative to its respective wave plate. The purpose of dampers 13 is to prevent the wire from vibrating and thereby varying the thickness of the dielectric between said wire and the negative plates 4.

Two parallel positive wires may be used for each set of negative wave plates, one over and the other under the wave plate, to boost the output of the pick-up; or more than one such pick-up units may be made to associate with the same vibrator, for the same purpose. A number of such possible combinations are shown in a, b, c, d and e in Fig. 14. Similar schemes may be resorted to also in the electro-magnetic method of translation.

The output of all the pick-ups is fed, through coupling circuits to vacuum tube amplifiers and reconverted into sound waves in the customary manner as shown in zones K and H of Fig. 11.

It is evident that the induced current by the electro-magnetic method (zone B of Fig. 5) varies although in complete accordance with the variations of the scanned plate area 6 it traces a different curve 7 due to the changes in the polarity of the current. It is also evident that the current curve, representing one wave length, comprises two distinct waves, 7 and 7a, identical in form but exactly opposite in phase relationship, with the curve 7 representing the wave form 6 during the tine's motion in one direction and the curve 7a representing the reverse 6a of said form during the tine's motion in the opposite direction. Because of these conditions the wave forms which do not have symmetrical sections cannot be exactly duplicated, although by carefully designing the pattern of the wave on the wave plate, it is possible to produce certain definite similarities to a given wave form. The purpose of this invention is not as much to imitate the tone of other musical instruments as to produce a rich and expressive musical tone with the simple harmonic tones of mechanical or electro-mechanical vibrators. However, a fairly exact reproduction of a given wave form may be accomplished by another method in which the magnetic flux, condensed in a narrow gap between the two knife-edged pole pieces of a magnet, is kept constant and the current variations are produced by varying the length of the conductor cutting across said magnetic lines. An embodiment of this method is diagrammatically shown in Fig. 8 and in perspective in Fig. 7.

The conductor, consisting of fine insulated wire, is wound on a selected wave form 8 (zone A, Fig. 6) which is punched out on a plate 9 similar to wave plate 4 but of non-magnetic and electrically non-conductive material. It is preferable to make the wave in bi-lateral form as in zone B of Fig. 6 which is the equivalent to that shown in zone A of Fig. 6 in that the length of the wire at any one point on zone B of Fig. 6 is equal to the length of the wire at the corresponding point on zone A of Fig. 6. Notches 14 are cut along the profile of the form 9 to prevent the displacement of the wire. A calculated number of lengths of wire may be wound over each notch and across the surface of the form as shown.

The action producing the current and its variations is similar to that which was described with reference to Fig. 1 in the above method, except that here a moving coil is made to cut across a narrow band of concentrated magnetic lines of force between the two sharp-edged pole pieces of the pick-up magnet. The longer this wire cutting the flux is, the greater will be the value of the induced current. Since the length of the wire varies as the outline of the wave form 8 on which it is wound, the curve of the induced current will correspond to that of said wave form.

As the motion of the tine, hence that of the conductor cutting across magnetic lines, is in one direction during one half of the period of a vibration and in the opposite direction during the other half period, the current will correspondingly reverse its direction at the end of each half period of a vibration. By employing half-wave rectification, one half of the current, produced by the tine's motion in one direction, can be made to flow in the outer circuit, and the other half, produced by said tine's motion in the opposite direction, can be made ineffective. It can easily be arranged that while the current produced by one of the tines of a fork is positive and flowing in the outer circuit, the current produced by the other tine will be negative and ineffective and vice versa. With one half of the wave form 8a assigned to one of the tines T1 and the other half 8b assigned to the other tine T2 as shown in Fig. 9, the combined alternating action of both tines will cause the flow of a current of one cycle or wave length during one whole period of one vibration, as graphically shown in Fig. 5 where zone C shows the selected wave form 8 and D and E describe the current flowing in the outer circuit as a result of the action of the tines T1 and T2 respectively. The same results by a similar action may also be obtained from a single tine vibrator having plates arranged as shown in Fig. 10. A circuit of such a system employing two half-wave rectifiers is shown in Fig. 11.

In still another modification of the invention, instead of one complex wave form 6, a plate may be made to contain two or more simple wave forms designed to produce sine wave currents of two or more different frequencies respectively. Such a simple wave form may be a rectangle triangle P1 shown on the upper line in Fig. 15 but it is not to be restricted or limited to that shape. On the principle already discussed, the area of the wave form P1 which constitutes the vibrating negative plate of a condenser, and therefore the capacity of said condenser increases from A—C to A—B during the tine's motion from right to left for example, and decreases from A—B to A—C during the tine's motion in the opposite direction. With the increasing capacity, if the current increases it will decrease, with the decreasing capacity, thereby producing one sine wave pulsation (see lower line) or one vibration during one cycle of the tine's motion and consequently the fundamental frequency which is the frequency of the tine in question. In the same way the wave form P2, an isosceles triangle comprising two identical P1 wave forms, will produce two vibrations, wave form P3 three vibrations, P4 four vibrations and P5 five vibrations during one cycle of the tine's motion and consequently the second, third, fourth and fifth partial frequencies respectively of the fundamental. In practice the length of all the wave forms F—G which is also the distance traversed by a tine from one end to the opposite end, is the same. Said length is exaggerated in Fig. 15 in order to make the illustration clearer. The figures bounded by solid lines are the actual wave forms cut out on the wave plate 4 and also represent the condenser capacities during the tine's motion in one direction. The spaces bounded by the dotted lines represent the capacities during the tine's motion in the opposite direction. Each wave figure P1, P2 etc., on the lower line represents the current produced by the wave form directly above on the upper line.

By combining the output of all the wave forms, P1, P2, etc., in the outer circuit and by amplifying and converting the resultant current into sound waves, a single composite tone is produced which will contain the fundamental frequency and as many partial frequencies as there are wave forms on a wave plate corresponding to said partial frequencies. One example of the arrangement for producing, by such a combination, of a composite tone which comprises a fundamental and four of its harmonic partials is shown in zone G of Fig. 11. The four tuning forks T1, T2 may be considered as having frequencies corresponding to the frequencies of four successive notes in the musical scale. The wave forms P1, P2 and P3 are assigned to the tine T1 and the wave forms P1, P4 and P5 to tine T2. Each one of said forms is included in a separate circuit. There are as many separate circuits, all connected in parallel, as there are wave forms on both tines T1 and T2 together. The wave forms on all the tines are included in corresponding circuits in parallel relationship as shown in zone G of Fig. 11.

The relative intensity of the partials of a composite tone thus produced may be varied according to a definite plan, through properly calculated resistances 21 inserted in series in the circuits containing the various partials. The intensity of a particular partial, the fundamental for instance, may also be enhanced by using more than one Pf wave form either on the same wave plate or on both plates as used in zone G of Fig. 11.

It was assumed that the amplitude of the vibration of the tine T, therefore the distance it traverses from either end to the opposite end, is a maximum and is uniform. This can be so when the tine is excited by electrical means. As the wave length F—G is made equal to said distance the pole edge N will scan the entire surface from F to G during the vibration of the tine producing a current and subsequently a tone that will be uniform in intensity and tone color in complete accordance with the curve of the selected wave form 6. However, if the tine is excited by striking it with a hammer for instance the amplitude of its vibration, therefore the distance it traverses will decrease, at a rate corresponding to the rate of the dissipation of its energy, from the maximum F—G to zero with a corresponding degree of change in the intensity and the timbre of the produced tone. In other words the produced tone will be the exact representative of the complete wave immediately after the tine is struck but will gradually change color as the vibration dies down. Nevertheless said tone, as the tone of an acoustic string piano or other percussion instruments, will be distinguished by the initial color apparent immediately after the impact of the hammer on the tine.

While the present preferred forms which the invention may assume have been shown and described in detail, it is not to be limited to such details and forms since many changes and modifications may be made in the invention without departing from the spirit and scope of the invention in its broadest aspects. Hence it is desired to cover any and all forms and modifications of the invention which may come within the language or scope of any one or more of the appended claims.

What I claim is:

1. An apparatus for producing electrical waves which comprises a plurality of condensers having as a plate in common a wire disposed so as to constitute the stationary plate of each and every one of said condensers, a plurality of vibrating elements each having a plate extending laterally from it and extending near said wire to form the vibrating plate of one of said condensers, means for producing an electric field between the wire and the vibrating plates, the latter having predetermined wave forms along their edges to vary by their vibratory action and in conformity with the dimensional variations in said wave forms the capacity of the condensers and thereby the value of the current flowing in the circuit containing the wire whereby electrical waves are produced in said circuit.

2. An apparatus for producing electrical waves which comprises a plurality of condensers having as a plate in common a wire disposed so as to constitute the stationary plate of each and every one of said condensers, a plurality of tuning forks each having a plate extending laterally from a tine and extending near said wire to form the vibrating plate of one of said condensers, a circuit including said wire, means for producing an electric field between the wire and the vibrating plates, the latter having wave forms along their edges designed to vary by their vibratory action the capacity of the condensers thereby to produce electrical sine waves in the circuit containing the wire, means for producing the multiples of said sine waves and means for combining said sine waves with their multiples thereby producing a composite electrical wave in said circuit substantially as described.

3. An apparatus for producing electric waves, said apparatus comprising a tuning fork; means for producing an electric field, said means comprising a stationary element having a narrow face having its length disposed substantially perpendicular to a plane of vibration of a tine of the fork, and an element comprising a plate fast on the free end of such tine in a plane substantially perpendicular to the axis of such tine and vibratory substantially in a plane of a substantially constant small distance from said narrow face and having an axis extending in a plane of vibration of such tine; said plate having a predetermined wave form along an edge thereof longitudinal to said axis of the plate; whereby during vibration the transverse line of said plate nearest to said narrow face varies in length and thereby varies the electric field in accordance with said wave form; and means cooperative and associated with and influenced by said electric field for producing electric current varying in accordance with variations of said electric field.

4. An apparatus for producing electric waves, said apparatus comprising a tuning fork having parallel tines; electric-field producing means comprising a substantially stationary element having a sharp edge having its length disposed substantially perpendicular to a plane of vibration of a tine of the fork, and a vibratory element comprising a plate fast on the free end of such tine in a plane substantially perpendicular to the axis of such tine at a distance from the stationary element and vibratory substantially in a plane of a substantially constant small distance from said sharp edge and having an axis extending in a plane of vibration of such tine; structure of said stationary element except at said edge being more remote from the adjacent portion of said plate than said edge; a portion of said plate at said sharp edge having an edge of predetermined wave form longitudinal to said axis of the plate and having sharp angles pointing toward and from said axis, said sharp edge being as long as said portion is wide; whereby during vibration, the transverse lines of said plate nearest to said sharp edge vary in length thereby causing variation of the electric field in accordance with said wave form; and means associated and cooperating with said producing means and influenced by the variations of said electric field for producing electric current varying in accordance with variations of said electric field.

5. An apparatus for producing electric waves, said apparatus comprising a tuning fork; electric-field producing means comprising a substantially stationary condenser element having a sharp edge having its length disposed substantially to a plane of vibration of a tine of the fork, and a vibratory condenser element comprising a plate fast on the free end of such tine in a plane substantially perpendicular to the axis of such tine and vibratory substantially in a plane of a substantially constant small distance from said sharp edge and having an axis extending in a plane of vibration of such tine; structure of said stationary element except at said edge being more remote from the adjacent portion of said plate than said edge; said plate having an edge of predetermined wave form longitudinal to said axis of the plate; whereby during vibration, the transverse line of said plate nearest to said sharp edge varies in length thereby causing variation of the electric field in accordance with said wave form; and means electrically connected and cooperating with said elements influenced by the variations of said electric field for producing electric current varying in accordance with variations of said electric field.

6. An apparatus for producing electrical waves which comprises a condenser having as a plate a wire; a plate having notches therein which are near said wire; the wire and notched plate being mounted for relative vibration, and circuit means including a source of electrical potential difference for producing an electric field between the wire and the notched plate, the latter having predetermined wave forms along their edges to vary by the vibratory action and in conformity with the dimensional variations in said wave form the capacity of the condenser and thereby the value of the current flowing in the circuit containing the wire whereby electrical waves are produced in said circuit.

7. In an apparatus for producing electric waves, a tuning fork; a plate secured fast on a tine thereof and projecting therefrom in a plane perpendicular to the longitudinal axis of the tine; said plate being provided with a predetermined wave form of teeth and notches at an edge portion extending in the direction of vibratory motion of the tine; and a stationary element having a narrow face near said notches and normally near but always spaced from and parallel to the mid portion of the plate and transverse to the direction of vibration of the plate; a device for producing a field of force between the material of the teeth and said element; and means for converting energy of motion of the teeth against said force into a flow of electrical energy, whereby during vibration of the fork and plate, motion of the teeth past said element will generate a current in said means and whereby at a constant period of vibration of the fork a wider amplitude of vibration of the fork and plate will cause more teeth to move past said element and produce a larger number of variations in said current than when the fork is vibrated with the same period and with a smaller amplitude.

8. In an apparatus for producing electric and sound waves, a tuning fork; a plate secured fast on a tine thereof and projecting therefrom in a plane perpendicular to the longitudinal axis of the tine; said plate being provided with a predetermined wave form of teeth and notches at an edge portion extending in the direction of vibratory motion of the tine; and a stationary element having a narrow face near said notches and normally near but always spaced from and parallel to the mid portion of the plate and transverse to the direction of vibration of the plate and producing a force on the material of the teeth, means for converting energy of motion of the teeth against said force into a flow of electrical energy and means for translating variations of said electrical energy into sound vibration having substantially the same frequency as said variation whereby at a constant period of vibration of the fork a wider amplitude of vibration of the fork and plate will cause more teeth to move past said element and produce a larger number of variations in said flow and thus a sound richer in harmonics of the fundamental frequency of the flow and of the fork than when the fork is vibrating with the same period but with a smaller amplitude, so that if the fork is struck, a note richer in harmonics is first emitted and the prominence of the harmonics decreases with the amplitude of fork vibration so as to simulate the sound of a percussion instrument.

9. In an apparatus for producing electric waves, a tuning fork; a plate secured on a tine thereof and projecting therefrom in a plane perpendicular to the longitudinal axis of the tine; said plate being provided with a predetermined wave form of teeth and notches at an edge portion extending in the direction of vibratory motion of the tine; and a stationary element having a narrow face near said notches and normally near but always spaced from and parallel to the mid portion of the plate and transverse to the direction of vibration of the plate; means for producing an electrically derivable field of force between material of the teeth and the element; and means for converting energy of motion of the teeth against said field of force into a flow of electrical energy.

DICKRAN SEBOUH.

REFERENCES CITED

The following references are of record in the file of this patent:

UNITED STATES PATENTS

| Number | Name | Date |
|---|---|---|
| Re. 22,321 | Fisher | May 25, 1943 |
| 1,580,112 | Bone | Apr. 13, 1926 |
| 1,637,442 | Dorsey | Aug. 2, 1927 |
| 1,638,993 | Hartley | Aug. 16, 1927 |
| 1,665,331 | Thomson | Apr. 10, 1928 |
| 1,904,494 | Matte | Apr. 18, 1933 |
| 1,941,036 | Lenk | Dec. 26, 1933 |
| 1,986,531 | Robb | Jan. 1, 1935 |
| 2,001,708 | Curtis | May 21, 1935 |
| 2,130,251 | Richards | Sept. 13, 1938 |
| 2,155,741 | Severy | Apr. 25, 1939 |
| 2,281,495 | Hammond | Apr. 28, 1942 |
| 2,289,183 | Ehret et al. | July 7, 1942 |
| 2,299,591 | Rex | Oct. 20, 1942 |
| 2,393,284 | Brown | Jan. 22, 1946 |
| 2,452,743 | Fuschi | Nov. 2, 1948 |

FOREIGN PATENTS

| Number | Country | Date |
|---|---|---|
| 22,866 | France | Mar. 10, 1921 |
| 310,550 | Italy | Aug. 23, 1933 |